United States Patent [19]
Canova

[11] Patent Number: 5,289,360
[45] Date of Patent: Feb. 22, 1994

[54] EQUIPMENT FOR THE GENERATION OF STABILIZED HIGH DIRECT VOLTAGE, PARTICULARLY FOR USE IN COMBINATION WITH A NON-POLLUTING MUFFLER

[75] Inventor: Antonio Canova, Montevarchi, Italy

[73] Assignee: Magnetek S.p.A., Siena, Italy

[21] Appl. No.: 898,841

[22] Filed: Jun. 15, 1992

[30] Foreign Application Priority Data

Jun. 17, 1991 [IT] Italy ........................................ FI91A

[51] Int. Cl.⁵ ............................................ H02M 3/335
[52] U.S. Cl. ........................................ 363/21; 60/274;
60/275; 181/212; 363/56
[58] Field of Search ................... 181/212; 363/21, 26,
363/56, 61; 60/274, 275; H02M 3/335

[56] References Cited

U.S. PATENT DOCUMENTS

| | | | |
|---|---|---|---|
| 3,976,448 | 8/1976 | Eng et al. | 55/122 |
| 4,209,826 | 6/1980 | Priegnitz | 363/21 |
| 4,616,300 | 10/1986 | Santelmann | 363/21 |
| 4,706,177 | 11/1987 | Josephson | 363/24 |
| 4,757,433 | 7/1988 | Santelmann | 363/56 |
| 4,794,506 | 12/1988 | Hino et al. . | |
| 4,816,979 | 3/1989 | Domann et al. | 363/21 |
| 4,823,070 | 4/1989 | Nelson . | |
| 4,845,605 | 7/1989 | Steigerwald | 363/21 |
| 4,853,832 | 8/1989 | Stuart . | |
| 4,945,721 | 8/1990 | Cornwell et al. | 60/274 |
| 5,132,890 | 7/1992 | Blandino | 363/21 |

FOREIGN PATENT DOCUMENTS

| | | | |
|---|---|---|---|
| 0027015 | 4/1981 | European Pat. Off. | H02M 3/335 |
| 0205630 | 12/1986 | European Pat. Off. | H02M 3/156 |
| 2651006 | 5/1977 | Fed. Rep. of Germany . | |
| 59-103914 | 6/1984 | Japan | F01N 3/02 |

Primary Examiner—William H. Beha, Jr.
Attorney, Agent, or Firm—McGlew and Tuttle

[57] ABSTRACT

Equipment for the generation of a stabilized high direct voltage is described, and includes: a step-up transformer (2) whose primary is supplied with a direct voltage and which is designed in such a way as to have dispersed inductances and parasitic capacitances which cause a resonance effect on the opening of the primary; a rectifying circuit (3) to rectify the voltage at the terminals of the secondary winding of the step-up transformer (2); a switch (11) which, when in the closed condition, connects the primary winding of the step-up transformer (2) to ground; and circuits (6,7,8,9) for controlling the opening and closing of the switch (11).

12 Claims, 6 Drawing Sheets

EQUIPMENT FOR THE GENERATION OF STABILIZED HIGH DIRECT VOLTAGE, PARTICULARLY FOR USE IN COMBINATION WITH A NON-POLLUTING MUFFLER

FIELD AND BACKGROUND OF THE INVENTION

The invention relates to equipment for the generation of a stabilized high direct voltage in such a way that it does not vary with the variation of the power absorbed by the load connected to it.

SUMMARY AND OBJECTS OF THE INVENTION

Basically, the equipment according to the invention comprises: a step-up transformer whose primary is supplied with a direct voltage; rectifying means to rectify the voltage at the terminals of the secondary winding of said step-up transformer; a switching means which, when in the closed condition, connects the primary winding of said step-up transformer to ground; and means of controlling the opening and closing of the switching means, the closing interval being determined as a function of the difference between the output voltage of said rectifying means and a predetermined reference voltage.

With equipment of this type it is possible to supply a muffler, for internal combustion engines, particularly diesel engines, which incorporates suitably shaped and positioned electrodes for the accumulation of unburnt particles for the purpose of preventing their release into the environment. The body of the muffler is kept at ground potential, while a high negative voltage of the order of 30 kV, supplied by the equipment according to the invention, is applied to the internal electrodes. A high electrical field is created between the body of the muffler and the electrodes; the combustion residues pass through this field and are attracted on to the body of said muffler. When the layer of accumulated particles reaches a level such that the distance between the surface of the layer of particles and the electrodes is less than the dielectric strength of the air in relation to the applied potential, an electrical discharge is generated and causes the combustion of the particles in such a way that the fumes emitted from the muffler are free from polluting unburnt substances.

Further advantageous characteristics of the equipment according to the invention are indicated in the attached claims and will be described in greater detail below with reference to the drawings.

The invention also relates to a method for the generation of a stabilized high direct voltage by means of a step-up transformer and rectifying means at the terminals of the secondary winding of said step-up transformer, wherein the voltage at the terminals of the primary winding of the step-up transformer is divided by opening and closing a ground connection of the primary winding of the step-up transformer, and wherein the closing interval of the ground connection is determined as a function of the deviation of the voltage value at the output of the rectifying means from a predetermined value, the opening of the connection generating a flyback voltage pulse in the windings of said step-up transformer.

The invention will be more clearly understood by following the description and the attached drawing which shows a practical non-restrictive embodiment of the invention. In the drawing,

DETAILED DESCRIPTION OF THE PREFERRED EMBODIMENT

Figure 1:
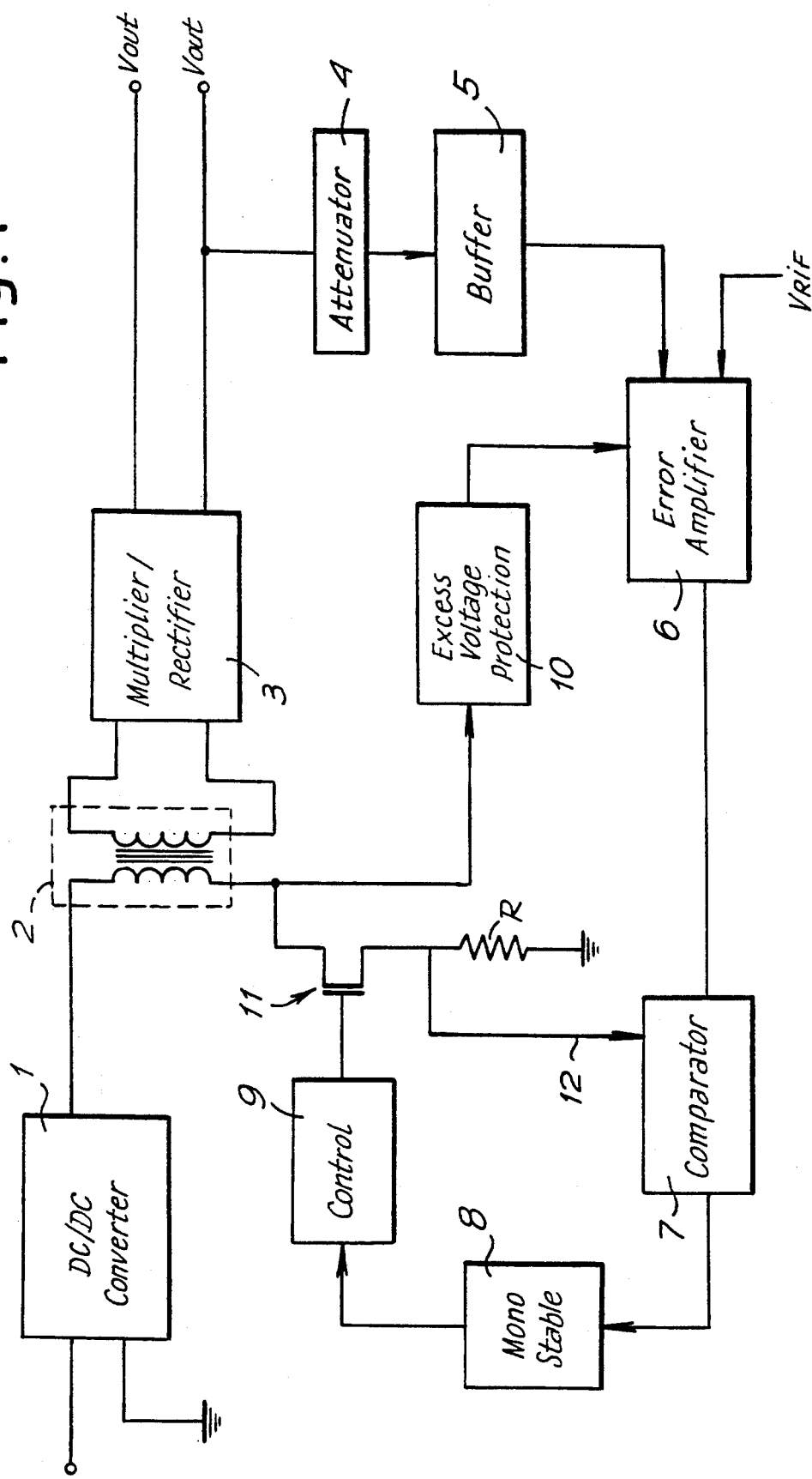
FIG. 1 is a summary block diagram of the equipment according to the invention.

With reference initially to the block diagram in FIG. 1, 1 indicates schematically a DC/DC converter at whose input there is present the low voltage Vin, for example the voltage supplied from the alternator of the vehicle in which the equipment is installed. At the output of the DC/DC converter (which, like the other functional blocks in FIG. 1, will be described in greater detail with reference to the circuit diagram in FIGS. 2A, 2B, 2C and 2D) there is a direct voltage of approximately 160V, which is applied to the primary of a step-up transformer 2. The voltage applied to the terminals of the primary of the transformer 2 is divided by the closing and opening of a switch 11 constructed with a MOSFET transistor which is alternately caused to conduct and to cut off in the way described below. During the time interval in which the transistor 11 is conducting, the direct voltage of approximately 160V leaving the DC/DC converter 1 is present at the terminals of the primary winding of the transformer 2. Conversely, during the cut-off interval of the transistor 11 a quasisinusoidal halfwave produced by an L/C circuit consisting of the primary inductance and the dispersed inductance of the transformer 2 and the parasitic capacitance of the windings of said transformer is present at the terminals of the primary of the transformer 2. The subsequent halfwaves form voltage peaks which are used as described below to generate the high output voltage of the equipment. By suitably controlling the transistor 11, these voltage peaks are delayed in such a way that the output voltage is substantially constant with the variation of the load applied to the high-tension terminal (Vout). More particularly, the interval between one peak and the next is determined from time to time as a function of any discrepancy between the high output voltage of the equipment and a preset voltage value. The conducting interval is selected in such a way that during this time an energy as great as the difference between the real voltage and the desired voltage may be accumulated in the transformer 2, so that in the subsequent cut-off interval of the transistor 11 sufficient energy is transferred to the secondary of the transformer 2 to overcome the difference between the actual voltage and the required voltage.

During the cut-off period of the transistor 11, there is present, at the terminals of the secondary winding of the transformer 2, the same voltage halfwave as is present at the terminals of the primary, but increased by a suitable factor defined by the turns ratio. In practice, to obtain an output voltage of approximately 30 kV, the turns ratio of the transformer 2 is such that there is a suitable voltage peak at the terminals of the secondary winding; the voltage at the terminals of the secondary may be suitably multiplied, according to the high voltage value required, with a voltage multiplier as described below. In this way the sinusoidal halfwave at the terminals of the secondary of the transformer 2 is further multiplied and smoothed by means of the multiplier/rectifier 3 to produce an output voltage approximately equal to the maximum voltage of the halfwave, for example of the order of −30 kV (Vout).

In order to keep the high output voltage of the multiplier/rectifier 3 constant, a control system for the transistor 11 is provided, which causes an alternation of cut-off and conduction periods of said transistor. This is obtained, in summary, in the following manner: the high output voltage of the multiplier/rectifier 3 (Vout) is attenuated by an attenuator 4, consisting in practice of a resistive voltage divider, and decoupled by a decoupling or buffer device 5.

The voltage at the output of the buffer 5 is compared with a reference voltage Vref (which may be adjustable) by an error amplifier 6. The output signal from the error amplifier 6 is compared by a comparator 7 with a signal 12 proportional to the energy which is stored in the step-up transformer 2 in each cycle. As the error signal increases, and consequently the deviation of the set output voltage from that actually present at the output of the multiplier/rectifier increases, so the energy to be stored in the transformer 2 and to be subsequently transferred to the high voltage output to compensate for the deviation, must increase equally. The signal resulting from the comparison made by the comparator 7 is sent to a set of circuits 8 and 9 which control the transistor 11 in such a way that it has a constant cut-off interval and a variable conducting interval.

The block diagram in FIG. 1 also has a block 10 which represents a system for protecting the circuit against an excessive rise in the high voltage (Vout) due to the failure of some component in said circuit.

FIGS. 2A to 2D represent portions of the circuit diagram for the device schematically represented by the block diagram in FIG. 1. The circuit diagram indicated by 1 (FIGS. 2A, 2B) indicates the circuit elements which form the DC/DC converter indicated by 1 in FIG. 1. This converter has two input terminals indicated by TB3 and TB6 respectively, to which the low voltage of 12 or 24V is applied. TB4 and TB5 indicate the output terminals, on the first of which is present a direct voltage of 160V for example, while the second is grounded. The converter 1 has a "push-pull" configuration with an integrated circuit indicated by PWM, which represents the pulse width modulator with a duty cycle of 50%. Out A and Out B indicate the two outputs of the PWM circuit for the control of the transistors U2, U15, U16, and U3, U17, U18 of the push-pull circuit. The Out A and Out B outputs of the PWM circuit are connected to two symmetrical blocks comprising, in addition to the transistors U2 and U3, a set of transistors indicated by U13, U14 respectively for the upper block and U11, U12 for the lower block, which have the function of improving the switching intervals of the transistors of the push-pull circuit.

The transistors U2, U15, U16, and U3, U17, U18 control the primary winding of a transformer T1, as provided in the usual push-pull configurations of a DC/DC converter of the conventional type. The PWM circuit is preset to provide an oscillation frequency of 100 kHz through the resistor R6 and the capacitor C5. A capacitor C6 provides a slow start, while an excess current control is provided through the inductances T2 and T3, the diodes D5 and D6, and the resistor R4. The primary of the transformer T1 is coupled to the secondary which in turn is connected to a diode bridge D1, D2, D3, D4 and to a capacitor C10 which rectify the pulsed voltage present on said secondary. Two resistors NTC1, NTC2, which vary as a function of the temperature, are disposed up-line from the capacitor C10 and have the function of limiting the current in the capacitor C10.

Figure 2A:
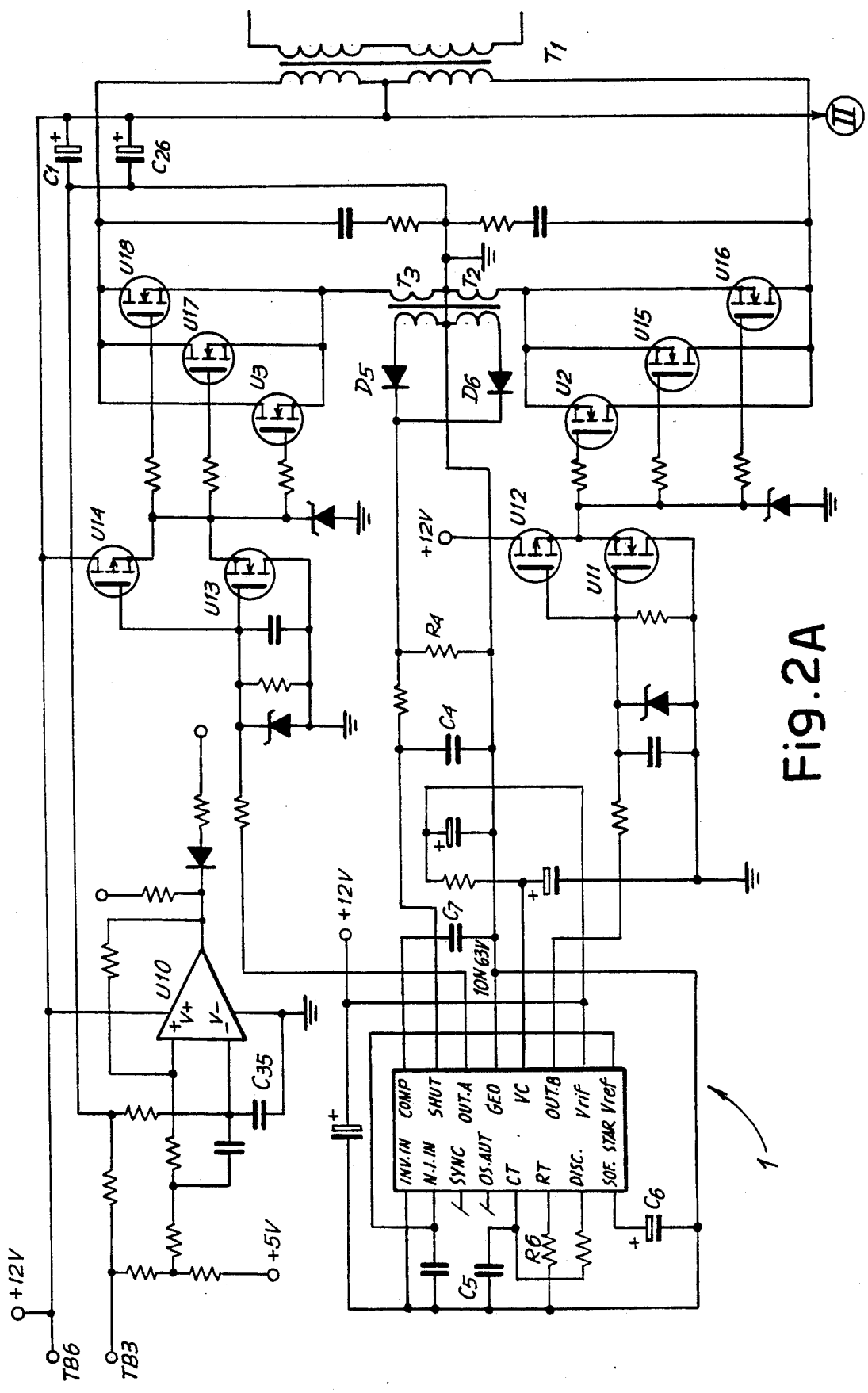
FIGS. 2A, 2B, 2C, and 2D form a detailed circuit diagram of the equipment.
Figure 2B:
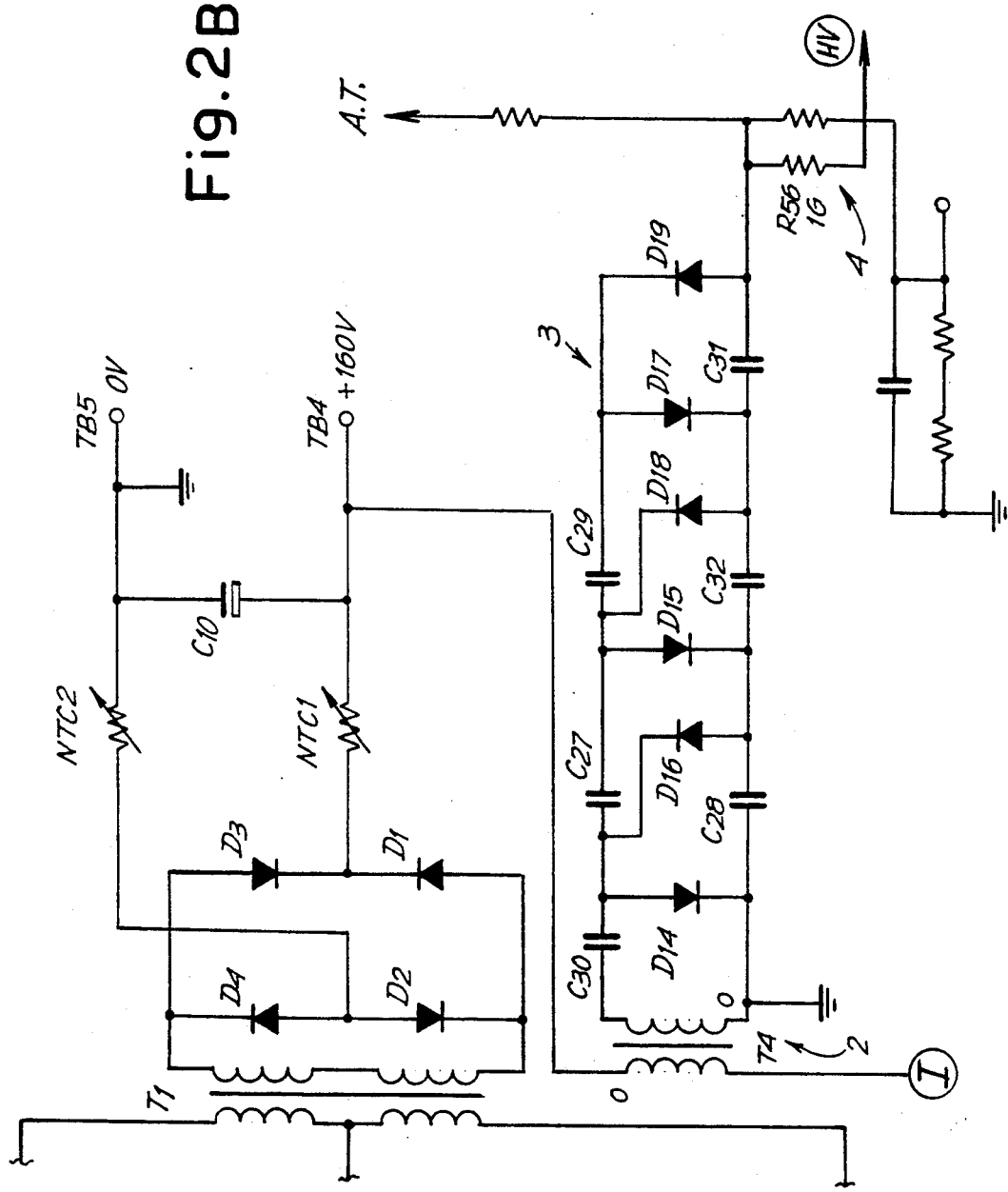

The voltage on the output terminal TB4 of the block 1 (V=160 V) is sent to the primary of the transformer 2, which is indicated as transformer T4 in the diagram in FIG. 2B. The primary of the transformer T4 is connected to ground through the MOSFET transistor indicated by 11 in FIG. 1 and also identified by the symbol U9 in the diagram in FIG. 2D. More particularly, one terminal of the primary of the transformer T4 is connected to the collector of the transistor 11, whose emitter is connected to ground through a group of three resistors in parallel, R44, R11, and R10, indicated in general by R (see also FIG. 1). The characteristic values of these resistors, and those of the electrical elements and/or the symbols of the components used in the characteristic blocks of the equipment are indicated in the electrical diagram in FIGS. 2A–2D. The connection between the primary of the transformer T1 and the transistor 11 is shown partly in FIG. 2B and partly in FIG. 2D. The connection point is identified by the two terminals indicated by I in said figures.

The secondary of the transformer T4 is connected to the multiplier/rectifier indicated generically by 3 (see also FIG. 1), at whose output is present the high voltage (A.T.) intended to supply the electrodes of the muffler. In the example in the drawing, the multiplier/rectifier 3 consists of three cells in parallel, each of which comprises two diodes and two capacitive elements. The first cell consists of the diodes D14 and D16 and the capacitors C28 and C30, the second cell consists of the diodes D15 and D18 and the capacitors C27 and C32, and the third cell consists of the diodes D17 and D19 and the capacitors C29 and C31.

The function of the blocks disposed between the multiplier/rectifier 3 and the transistor 11 is to maintain the voltage A.T. at a constant and predetermined value with variations in the applied load, in other words, for example, during the period of accumulation of unburnt particles on the wall of the muffler and during the electrical discharge which is responsible for their combustion. For this purpose, the high voltage A.T. present on the high voltage terminal of the multiplier/rectifier 3 is attenuated by the attenuator 4 which consists of a voltage divider comprising the two resistors R56 and R41 shown in FIGS. 2B and 2C. One terminal of the resistor R56 is connected to the A.T. terminal of block 3, while the other terminal is indicated by HV on the right of FIG. 2B and has an electrical connection (not visible in the diagram) with the HV terminal shown on the left of FIG. 2C. The resistor R41 is connected between the HV terminal and a terminal at the direct voltage of 5V. The voltage between the two resistors R56 and R41, equal to approximately 2V, is sent to the positive input terminal of an operational amplifier U8A which performs the functions of the buffer 5 in the block diagram in FIG. 1. The operational amplifier U8A is a voltage follower with high input impedance, and the voltage present at the positive input is also present at its output. This voltage is sent to the positive terminal of a further operational amplifier indicated by U8B which performs the functions of block 6 of the diagram in FIG. 1; it therefore forms an error amplifier. A reference voltage produced by a ground connection through the interposition of a variable resistor R37 is present at the negative input of the amplifier U8B. The variable resistor R37 makes it possible to modify the reference voltage and consequently the nominal voltage which is to be maintained at the high voltage (A.T.) terminal. The reference voltage is stabilized by means of the circuit consisting of the Zener diode U7 and the resistors R25 and R31.

The output of the amplifier U8B consists of a voltage signal proportional to the difference between the reference voltage Vref and the attenuated output voltage from the voltage follower U8A, in turn is proportional to the high voltage present at the output terminal of the multiplier/rectifier 3. The transistor 11 is controlled on the basis of this error signal to keep the high voltage value constant.

Figure 3:
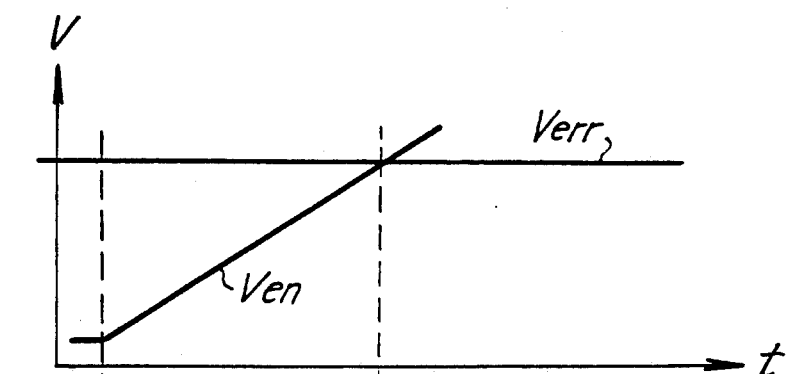
FIGS. 3 to 7 are diagrams of voltage at various points of the circuit.

For this purpose, the error signal (Verr) is sent to the positive input of an operational amplifier U6 which performs the functions of the block schematically indicated by 7 in the block diagram in FIG. 1. A signal (corresponding to the signal indicated by 12 in FIG. 1) is present at the negative input of the operational amplifier U6, and is proportional to the energy stored in the transformer T4 during the period of conduction of the transistor 11. FIG. 3 is a schematic diagram in which Ven represents the voltage signal proportional to the energy stored in the transformer T4, and Verr indicates the error signal, while the time is shown on the axis of abscissae.

Figure 4:
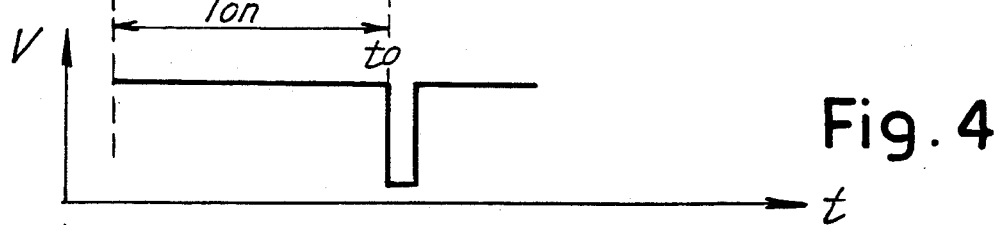
Figure 5:
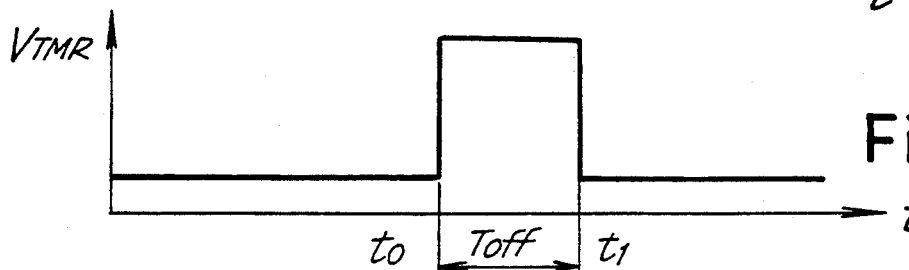

The output signal of the operational amplifier U6 is high until the error signal (Verr) exceeds the signal (Ven) proportional to the energy stored in the transformer T4, in other words the output of the operational amplifier U6 is high throughout the time interval Ton indicated in FIG. 3. This interval increases with the value of Verr, in other words with the error detected between the high voltage actually present at the A.T. terminal of the block 3 and the preset desired voltage. This corresponds to the fact that as the discrepancy between the actual voltage and the desired voltage increases, the energy pulse supplied to the multiplier/rectifier circuit during the cut-off period of the transistor 11 must increase equally. As soon as the value Ven reaches (at the time t0) the value Verr, the output of the operational amplifier U6 switches from high to low, and this pulse (shown in FIG. 4) is transmitted to the trigger of an integrated circuit TMR, for example a 555 integrated circuit. This pulse produces, at the output of the integrated circuit TMR, a voltage pulse of predetermined duration, defined by the values of the resistor R21 and the capacitor C18 connected to TMR. The voltage pulse at the output of the integrated circuit TMR is indicated in the diagram in FIG. 5, where Toff represents the (fixed) temporal duration of this pulse.

Figure 6:
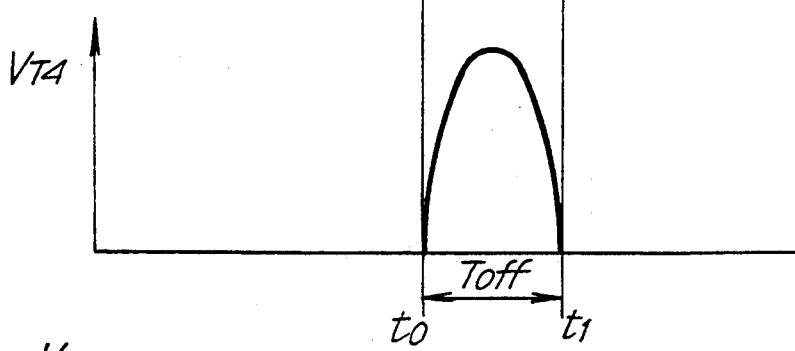

The voltage pulse at the output of the integrated circuit TMR causes, by means of two transistors Q1 and Q2, the cut-off of the transistor 11. The circuit in which the transistors Q1 and Q2 are inserted corresponds to the block 9. The cut-off of the transistor 11 has a fixed duration, equal to the time interval Toff, during which an approximately sinusoidal halfwave represented in the diagram in FIG. 6, with a duration equal to Toff, is present on the primary of the transformer T4. This halfwave, which is basically a flyback pulse, is once again present with its voltage suitably raised, at the terminals of the secondary of the transformer T4. During the voltage peak of duration Toff, the energy stored in the transformer T4 is transferred to the multiplier/rectifier 3 and then to the high voltage (A.T.) terminal. At the end of the interval Toff the transistor 11 returns to the conducting state, so that the voltage at the terminals of the primary of the transformer T4 is again equal to the direct voltage of 160V and the transformer stores energy. The conduction time is a function, as described above, of the value of the error between the real voltage at the A.T. terminal and the required voltage. When the transformer T4 has stored sufficient energy, the output of the operational amplifier U6 supplies an input pulse to the circuit TMR, which returns the transistor 11 to the cut-off state to enable energy to be transferred to the multiplier/rectifier.

Figure 7:
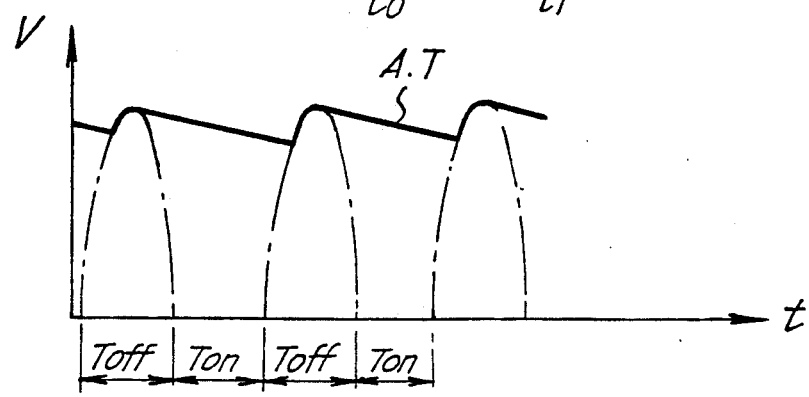

FIG. 7 schematically shows (in broken lines) a series of successive halfwaves, corresponding to a series of cut-off cycles of the transistor 11, which is present at the terminals of the secondary of the transformer T4. Also shown in FIG. 7, — in the solid line, the corresponding voltage value at the output of the multiplier/rectifier.

Figure 2C:
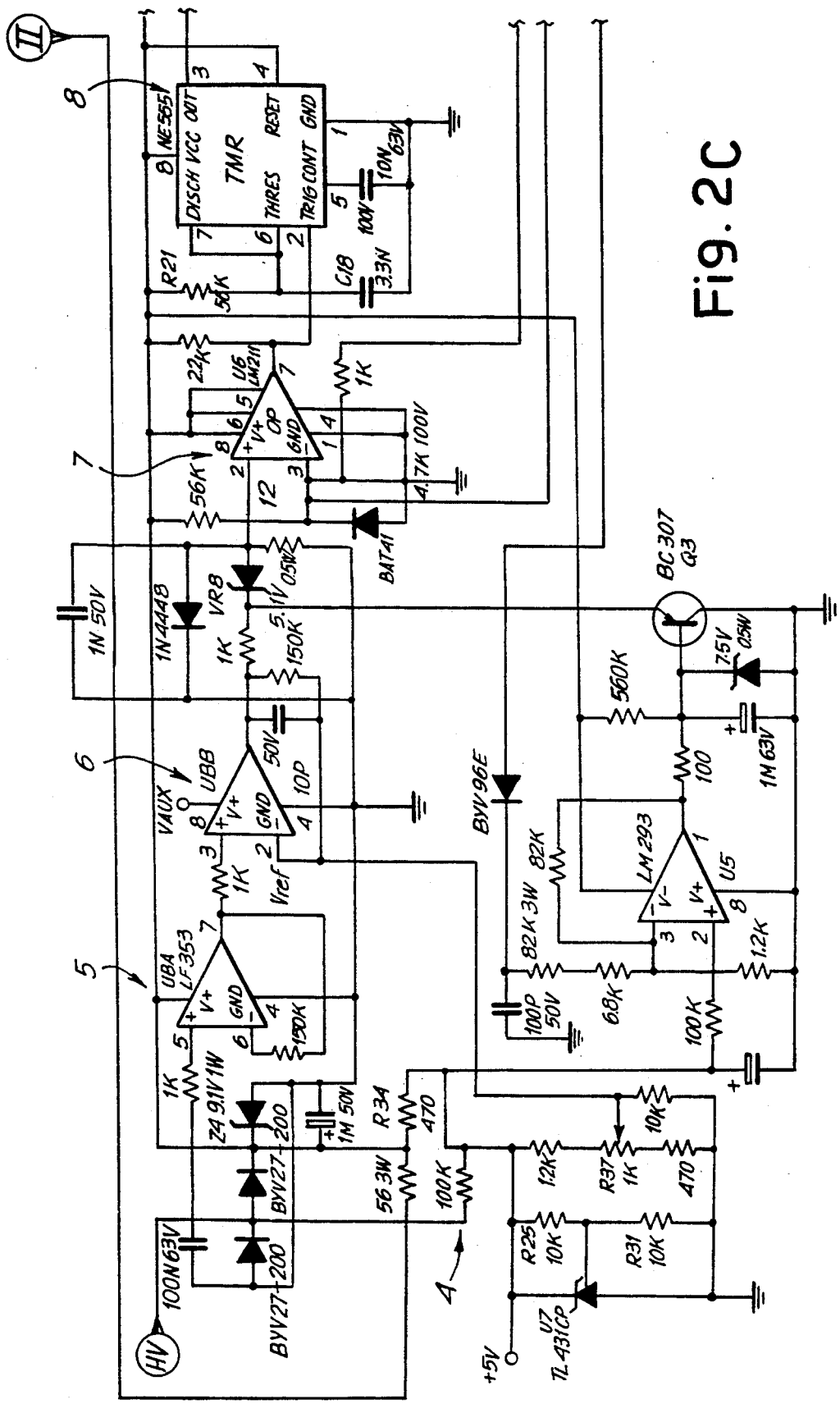
Figure 2D:
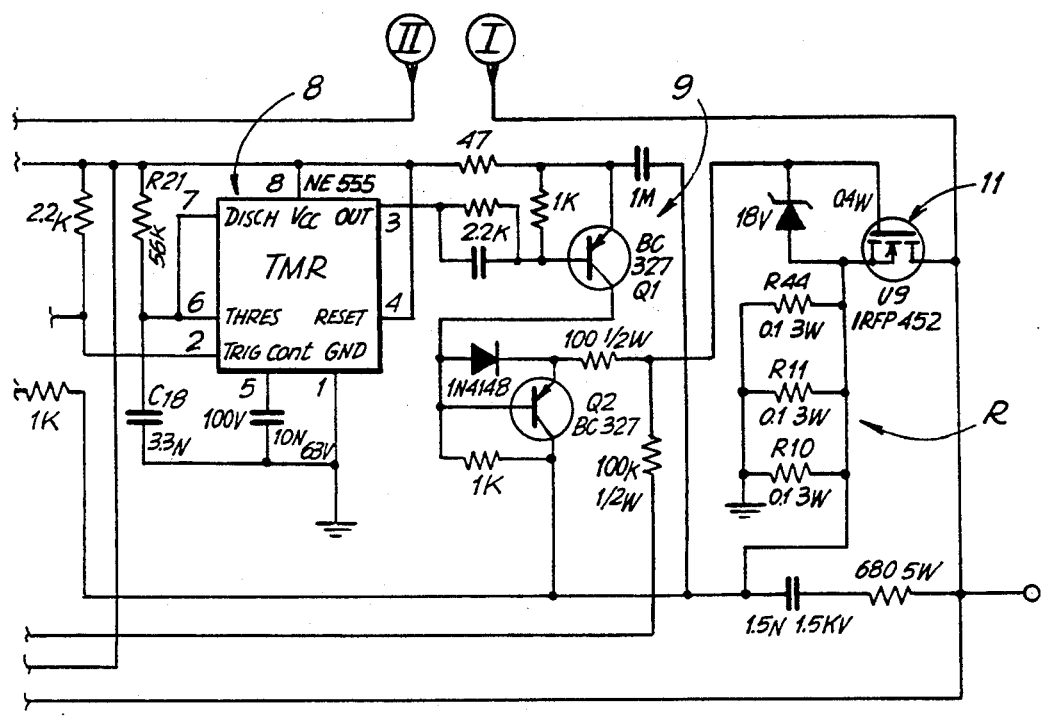

The power supply to the components U8A, U8B, U6, and TMR is taken from the primary of the transformer T1 through the line interrupted at II in the parts of the circuit indicated in FIGS. 2A and 2C. A circuit comprising a 9.1V Zener diode Z4 is used to stabilize the power supply to the previously mentioned components.

FIG. 2C further shows the circuit of the block schematically indicated by 10 in FIG. 1. This block comprises an operational amplifier U5 acting as a comparator. A voltage signal proportional to the output voltage of the primary of the transformer T4 is applied to the negative input of the amplifier U5, while a low voltage signal stabilized at 5V is applied to the positive input. The output of the comparator U5 is connected to the positive input of the operational amplifier U6. While the voltage at the negative input of the comparator U5 is lower than the safety value at the positive input, the output of said comparator U5 is sufficient to maintain the output of the operational amplifier U6 at a high level. Conversely, when the value of the voltage at the negative input of the comparator U5 exceeds the safety value applied to the positive input, a pulse is generated at the output of the comparator U5, and this pulse, being applied to the positive input of the operational amplifier U6, produces a low pulse at the output of the latter, and consequently a signal from the integrated circuit TMR which produces a cut-off cycle of the transistor 11. This cut-off is substantially advanced with respect to that which would be caused by the normal switching of the output of the operational amplifier U6 when the signal Ven reaches the value Verr. This, in practice, limits the maximum voltage of the sinusoidal wave present in the primary and secondary windings of the transformer T4, interrupting the period of conduction of the transistor 11 before the normal time and thus limiting the energy accumulated in the transformer T4.

It is to be understood that the drawing shows only an example provided solely as a practical demonstration of the invention, it being possible to vary this invention in its forms and dispositions without thereby departing from the scope of the guiding concept of said invention. Any presence of reference numbers in the attached claims has the purpose of facilitating the reading of the claims with reference to the description and drawing, and does not limit the scope of the protection represented by the claims.

I claim:

1. A device for generation of a stabilized high direct voltage, the device comprising:
   a step-up transformer with primary leads connectable to a direct voltage, said step-up transformer having dispersed inductances and parasitic capacitances causing a resonance effect on opening of one of said primary leads of said set-up transformer;
   a rectifier means connected to secondary leads of said step-up transformer and for rectifying voltage from said secondary leads to an output voltage;
   switching means for connecting and disconnecting one of said one primary leads of said step-up transformer to ground through a resistor;
   reference voltage means for providing a reference voltage;
   error amplifier means for comparing said reference voltage with said output voltage of said rectifier means and generating an output error voltage signal proportional to a difference between said reference voltage and said output voltage;
   comparator means for comparing said output error voltage signal with a resistor voltage across said resistor of said switching means;
   control means connected to said comparator means and for controlling said connecting and disconnecting of said switch means, said control means disconnecting said switch means for a predetermined fixed time interval when an output level of said comparator means changes.

2. A device in accordance with claim 1, wherein:
   said predetermined time of said control means is constant during operation of the device;
   said control means disconnects said switch means when said resistor voltage is equal or greater than said output error voltage.

3. A device in accordance with claim 14, further comprising:
   a DC/DC converter connected between said primary leads of said step-up transformer and the direct voltage source;
   voltage multiplier means for multiplying said rectified voltage to form said output voltage.

4. The device as claimed in claim 3, wherein said DC/DC converter has a push-pull configuration.

5. The device as claimed in claim 1, wherein said switching means is a transistor.

6. The device as claimed in claim 1, wherein means are provided to attenuate and decouple said output voltage of the rectifier means and to send said attenuated and decoupled voltage to said error amplifier means.

7. The device as claimed in claim 1, wherein said reference voltage is variable.

8. The device as claimed in claim 1, further comprising means of excess voltage protection in the step-up transformer, said means of protection comprise a comparator to whose inputs are applied respectively a protection reference voltage and a voltage proportional to the energy stored in the step-up transformer during the connecting of the switching means, and whose output is connected to said control means, the output of said comparator being capable of causing an advanced opening of said switching means.

9. A device in accordance with claim 1, wherein:
   said control means includes a mono-stable circuit.

10. A device in accordance with claim 1, wherein:
    said resistor of said switching means is chosen to cause said resistance voltage to be proportional to a magnitude of energy stored in step-up transformer when said switch means is closed;
    said output level of said comparator means changing when the energy stored in said step-up transformer is equal or greater than a difference between said output voltage and predetermined desired voltage.

11. A method for generation of a stabilized high direct voltage, the device comprising:
    providing a step-up transformer;
    supplying a DC voltage to primary leads of said step-up transformer;
    rectifying a secondary voltage across secondary leads of said step-up transformer;
    generating an output voltage signal proportional to said rectified voltage;
    comparing said output voltage signal with a reference voltage and generating an error voltage signal proportional to a difference between said reference voltage and said output voltage signal;
    providing a switch and a resistor between one of said primary leads of the step-up transformer and ground;
    comparing said error voltage signal with a resistor voltage across said resistor when said switch is closed;
    opening said switch for a predetermined and fixed time interval when said resistor voltage is equal to said error voltage signal.

12. A method in accordance with claim 11, further comprising:
    providing a DC/DC convertor;
    supplying a low DC voltage to an input of said DC/DC convertor;
    supplying an output of said DC/DC convertor to said step-up transformer;
    multiplying said rectified voltage to a desired voltage output.

* * * * *